(12) United States Patent
Nandra et al.

(10) Patent No.: US 6,272,320 B1
(45) Date of Patent: *Aug. 7, 2001

(54) BASE STATION FOR A CONTACTLESS INTERROGATION SYSTEM COMPRISING A PHASE LOCKED AND VOLTAGE CONTROLLED OSCILLATOR

(75) Inventors: Navraj Nandra, Le Landeron; Thierry Roz, Neuchâtel, both of (CH)

(73) Assignee: EM Microelectronic-Marin SA, Marin (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,838

(22) Filed: Jan. 12, 1998

(30) Foreign Application Priority Data

Feb. 5, 1997 (CH) .................................................. 249/97

(51) Int. Cl.⁷ .................................................. H04Q 7/20
(52) U.S. Cl. .................................................. 455/41; 340/10.3
(58) Field of Search ............................. 455/41, 561, 260, 455/113, 107, 121, 123; 340/825.72, 870.31, 870.37, 10.3, 10.1, 572.7; 235/380, 439, 449, 488; 375/327, 328, 329, 376, 371, 373, 375; 327/156; 342/42, 51

(56) References Cited

U.S. PATENT DOCUMENTS

| | | | |
|---|---|---|---|
| 3,689,885 | * | 9/1972 | Kaplan et al. .................. 340/149 |
| 3,949,401 | * | 4/1976 | Hegeler et al. .................. 343/200 |
| 4,063,173 | * | 12/1977 | Nelson et al. .................. 455/20 |
| 4,107,613 | * | 8/1978 | Queen et al. .................. 325/348 |
| 4,169,260 | | 9/1979 | Bayer .................. 340/562 |
| 4,207,522 | * | 6/1980 | Thornton et al. .................. 455/77 |
| 4,388,524 | | 6/1983 | Walton .................. 235/380 |
| 4,472,820 | * | 9/1984 | Borras .................. 235/92 |
| 4,531,526 | * | 7/1985 | Genest .................. 128/630 |
| 4,724,427 | * | 2/1988 | Carroll .................. 340/572.7 |
| 4,754,862 | * | 7/1988 | Rawicz-Szczerbo et al. ....... 194/319 |
| 5,055,849 | * | 10/1991 | Andersson et al. .................. 342/104 |
| 5,180,046 | * | 1/1993 | Hutton et al. .................. 194/319 |
| 5,279,042 | * | 1/1994 | Gonzalez et al. .................. 455/66 |
| 5,337,039 | * | 8/1994 | Simon .................. 340/562 |
| 5,491,715 | * | 2/1996 | Flaxl .................. 375/344 |
| 5,541,604 | * | 7/1996 | Meier .................. 342/42 |
| 5,568,512 | * | 10/1996 | Rotzoll .................. 375/221 |
| 5,602,540 | * | 2/1997 | Spillman, Jr. et al. ......... 340/870.37 |
| 5,764,697 | * | 6/1998 | Sakuma et al. .................. 340/825.69 |
| 5,777,562 | * | 7/1998 | Hoffman .................. 340/870.07 |
| 5,825,833 | * | 10/1998 | Sakaue .................. 455/182.2 |
| 5,898,733 | * | 12/1998 | Satyanarayana .................. 222/153.13 |

FOREIGN PATENT DOCUMENTS 0 722 155    7/1996 (EP) .
WO 91 16696    10/1991 (WO) .

OTHER PUBLICATIONS

Patent Abstracts of Japan vol. 096, No. 011, Nov. 29, 1996 & JP 08 172378 A (Matsushita Electric Works Ltd).

* cited by examiner

Primary Examiner—Dwayne Bost
Assistant Examiner—Jean A Gelin
(74) Attorney, Agent, or Firm—Griffin & Szipl, P.C.

(57) ABSTRACT

A base station (13) for a contactless interrogation system includes an oscillating device (23) supplying a control signal having a frequency which is adjustable via adjusting circuits (21, 22), a circuits (24) for controlling an antenna connected to the base station (13) for transmitting information, decoding circuits (25, 26, 27) for decoding the information picked up by the antenna. The oscillating device (23) is a voltage controlled oscillator which is phase locked by the adjusting circuits (21, 22), so that the control signal frequency is determined by the base station (13) and is adapted to the antenna. The sensitivity of a contactless interrogation system comprising the base station (13) of the present invention is improved, its structure is simpler and its different components can be integrated in a same chip.

9 Claims, 3 Drawing Sheets

BASE STATION FOR A CONTACTLESS INTERROGATION SYSTEM COMPRISING A PHASE LOCKED AND VOLTAGE CONTROLLED OSCILLATOR

FIELD OF THE INVENTION

The present invention concerns a base station for a contactless interrogation system using a phase locked and voltage controlled oscillator.

BACKGROUND OF THE INVENTION

Base stations are conventionally used in contactless interrogation systems such as entrance doors which can be opened by bringing near them transponders such as entry cards. A base station essentially includes an oscillating control device, an amplitude modulating circuit and control means acting on an antenna connected to the base station. The oscillating control device is conventionally a peripheral device. The oscillating control device is generally a quartz crystal which supplies a control signal having a determined carrier frequency, when the quartz crystal vibrates at a frequency generally higher than the resonant frequency of the antenna (typically 1 MHz). The control signal is then modulated by the modulating circuit which also currently comprises a division chain for bringing the control signal frequency to the antenna resonant frequency (typically 125 MHz). Then this signal is transmitted by the antenna which is essentially formed of a coil. The transmitted modulated signal is capable of being received by a transponder if the latter is brought near the base station.

Transponders essentially do not have batteries and are intended to exchange information on data with a contactless interrogation device such as a base station of the aforementioned type. The supply voltage is supplied to the transponders from the control signal transmitted by the base station. This signal is modulated by the transponder, and the signal thus modified is intended to be read by the base station.

British Patent Application NO 95175626.1 discloses such a base station used in a vehicle anti-theft system.

A problem encountered with these base stations lies in the fact that the carrier frequency Fo of the modulated control signal has to be as close as possible to the antenna resonant frequency Fr1, and the transponder resonant frequency, Fr2. The effect of this is to increase the reading sensitivity of the base station.

Base stations according to the prior art do not provide a satisfactory solution to this problem. The dispersion of the values of all system components induces a notable difference between the antenna resonant frequency and the frequency supplied to the antenna. The base station reading sensitivity is linked to fluctuations in the voltage across the terminals of the antenna, which are themselves linked to variations in the signal received by the antenna. By way of illustration, FIG. 1a shows the voltage fluctuations $\Delta V$ across the antenna terminals as a function of the frequency Fr1 and the frequency Fr2, frequency Fo being equal to 125 kHz, and FIG. 1b shows some isovalue curves (i.e. at constant $\Delta V$) associated with FIG. 1a. The frequency range within which the base station operates properly is limited to a few percent around the frequency Fo, as is better shown in FIG. 1b. Thus a difference between the transmitted signal frequency and the antenna resonant frequency leads to a loss of power during exchange with the transponder.

The presence of regions corresponding to negative $\Delta V$ fluctuations, i.e. regions in which the data originating from the transponder is inverted, will also be noted in FIG. 1b. The base stations of this type of the prior art thus have an additional drawback. It is understood that the presence of the inversion regions may be particularly inconvenient when these base stations are used, for example, in an entrance door opening system.

Other solutions exist in the prior art, in particular base stations in which the components are discreet, complex and thus expensive. For example, the aforecited Patent Application discloses a contactless interrogation base station using a microprocessor as oscillating control device.

SUMMARY OF THE INVENTION

An object of the present invention is to provide a base station for a contactless interrogation system comprising an oscillating control device able to supply a control signal whose carrier frequency is adapted to the resonant frequency of the antenna, the station being inexpensive and easy to make.

Another object of the present invention is to provide a base station comprising an oscillating control device in a same integrated structure.

These objects, in addition to others, are achieved by a base station for a contactless interrogation system including an oscillating device supplying a control signal having a frequency which is adjustable via adjusting means, means for controlling an antenna connected to the base station for transmitting information, means for decoding the information picked up by the antenna, characterised in that the oscillating device is a voltage controlled oscillator which is phase locked by said adjusting means so that the control signal frequency is determined by the base station and is adapted to the antenna.

An advantage of the present invention is to provide a highly sensitive base station, i.e. a base station using continuous and optimum adjustment of the control signal carrier frequency as a function of the antenna.

Another advantage of the present invention is to provide a base station able to operate over a frequency range comprised between 100 and 150 Khz.

Another advantage of the present invention is to provide a base station formed of integrated components whose structure is relatively simple.

The objects, features and advantages of the present invention will appear more clearly upon reading the detailed description of a preferred embodiment of the invention, given solely by way of example, in relation to the annexed drawings.

BRIEF DESCRIPTION OF THE DRAWINGS

FIG. 4b shows some isovalue curves associated with FIG. 4a.

DESCRIPTION OF THE INVENTION

Figure 2:
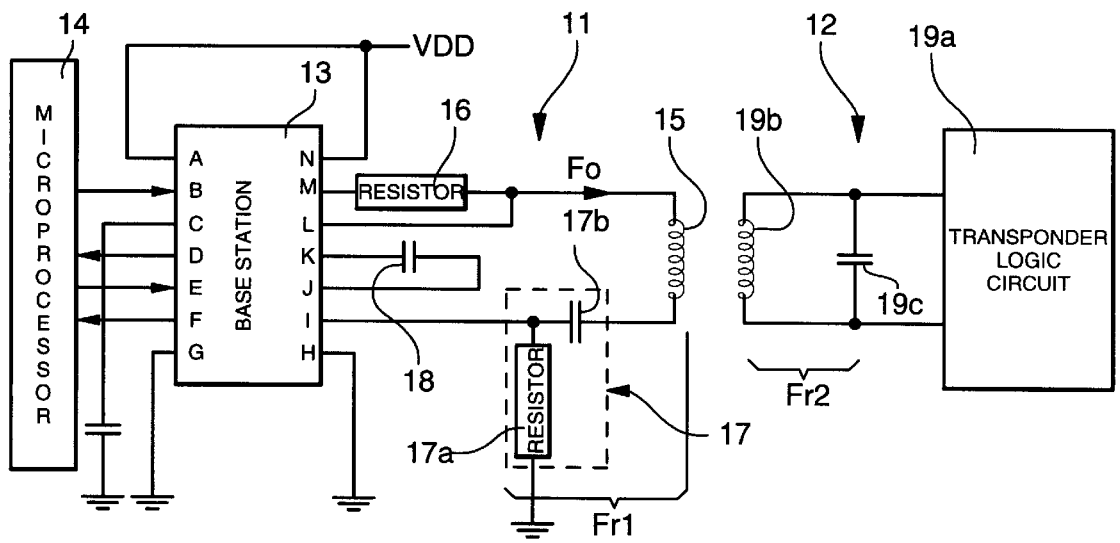
FIG. 2 shows a simplified diagram of a contactless interrogation system comprising a base station according to the invention.

FIG. 2 shows a complete structure of a contactless interrogation system comprising a transceiver 11 and a transponder 12.

Transceiver 11 essentially comprises a base station 13, a microprocessor 14 and an antenna 15. Base station 13 comprises fourteen pins designated by references A to M. Pins A and N are connected to a power supply providing a voltage VDD, pins G and H are directly grounded and pin C is grounded via a decoupling capacitor. Microprocessor 14 is connected to pins B, D, E and F. Antenna 15 essentially comprises a coil having two terminals, a first terminal being connected to pin L and to pin M via a resistor 16, and a second terminal being connected to pin I via a detection circuit 17. Detection circuit 17 can be a conventional resonant circuit comprising a resistor 17a and a capacitor 17b in FIG. 2. A filter capacitor 18 is connected to terminals K and J.

Transponder 12 essentially comprises a coil 19b and a capacitor 19c connected in parallel across coil 19b, which is capable of exchanging energy with antenna 15 and logic circuits 19a, such as memories, to modify the control signal, as described hereinbefore.

Figure 3:
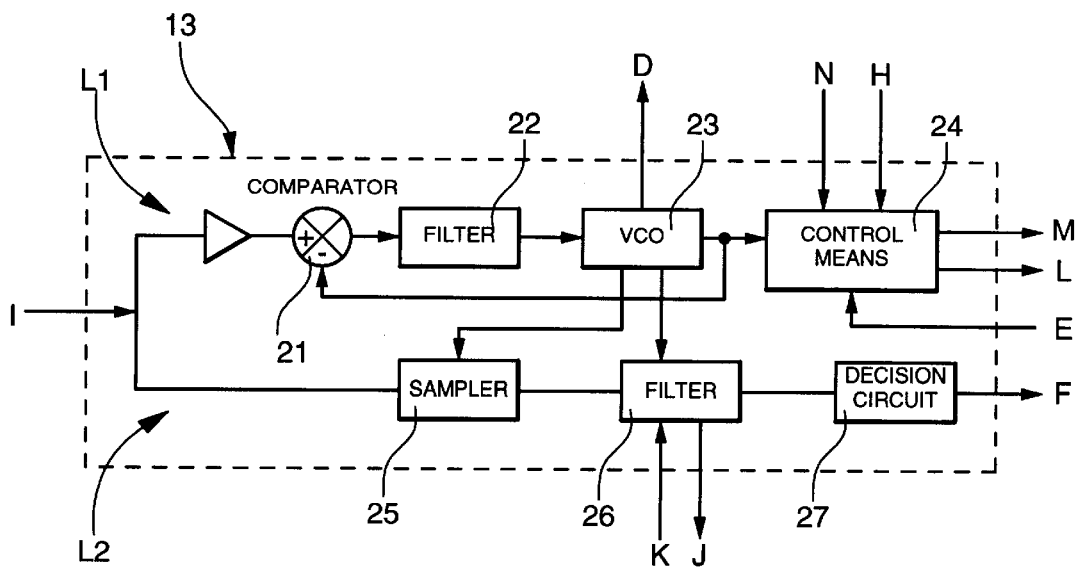
FIG. 3 shows a block diagram of the base station of the FIG. 2.

FIG. 3 shows the block diagram of base station 13. Pin I is connected to two lines L1 and L2.

Line 1 connects in series to pin I, a phase comparator 21, a filter 22, a voltage controlled oscillator 23 and means 24 for controlling the antenna, and comprises a feedback loop beginning from the point of connection between oscillator 23 and control means 24 to comparator 21. Oscillator 23 has another output connected to pin D and which provides a clock signal to microprocessor 14. Control means 24 further comprise inputs connected to pins E, N and H and outputs connected to pins M and L.

Line 2 connects in series to pin I a sampler 25, a pass-band filter 26 and a decision circuit 27 whose output is connected to pin F. Sampler 25 also comprises an input connected to oscillator 23. Pass-band filter 26 further comprises two inputs connected to pin K and to oscillator 23 and an output connected to pin J.

Base station 13 allows two operating modes: the transmission mode and the receiving mode.

Transmission is achieved via line L1. More precisely, control means 24 provide a current to antenna 15 to generate an electromagnetic field. Detection circuit 17 then provides a voltage to pin I in phase with the control signal supplied by oscillator 23. Thus the set comprising the elements 21, 22 and 23 allows the frequency Fo of the control signal to be kept equal to the resonant frequency Fr1 of antenna 15.

Figure 1A:
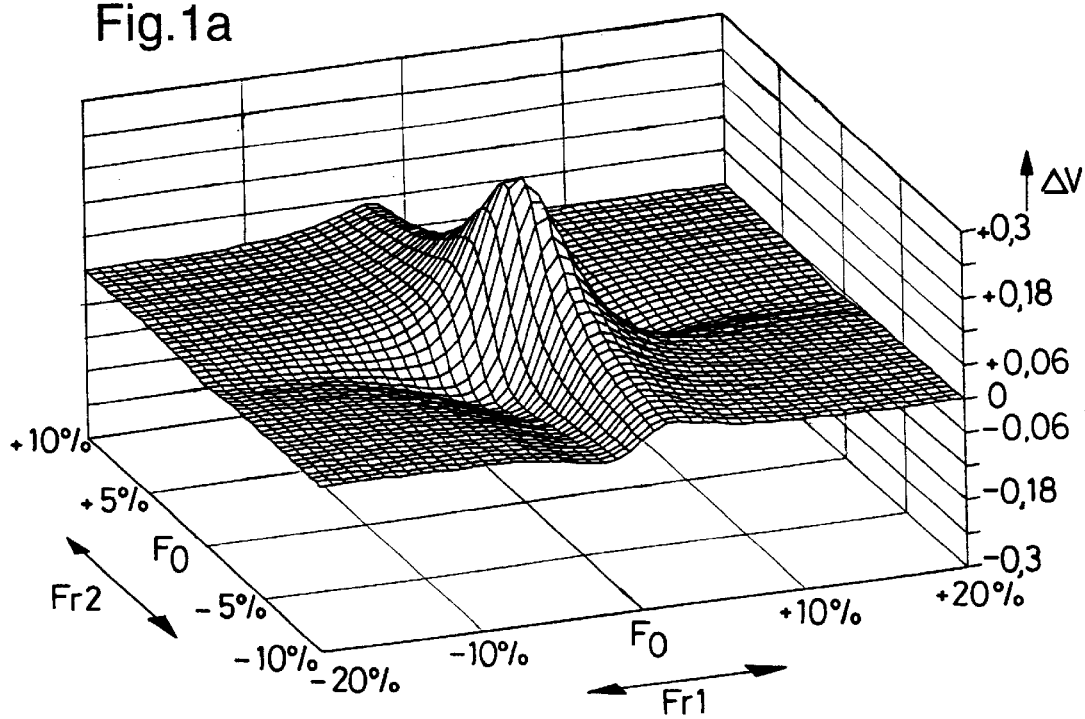
FIG. 1 shows the voltage fluctuations across the terminals of the antenna as a function of the resonant frequency of the antenna and the resonant frequency of the transponder, for a contactless interrogation system comprising a prior art base station of the type described hereinbefore.
Figure 1B:
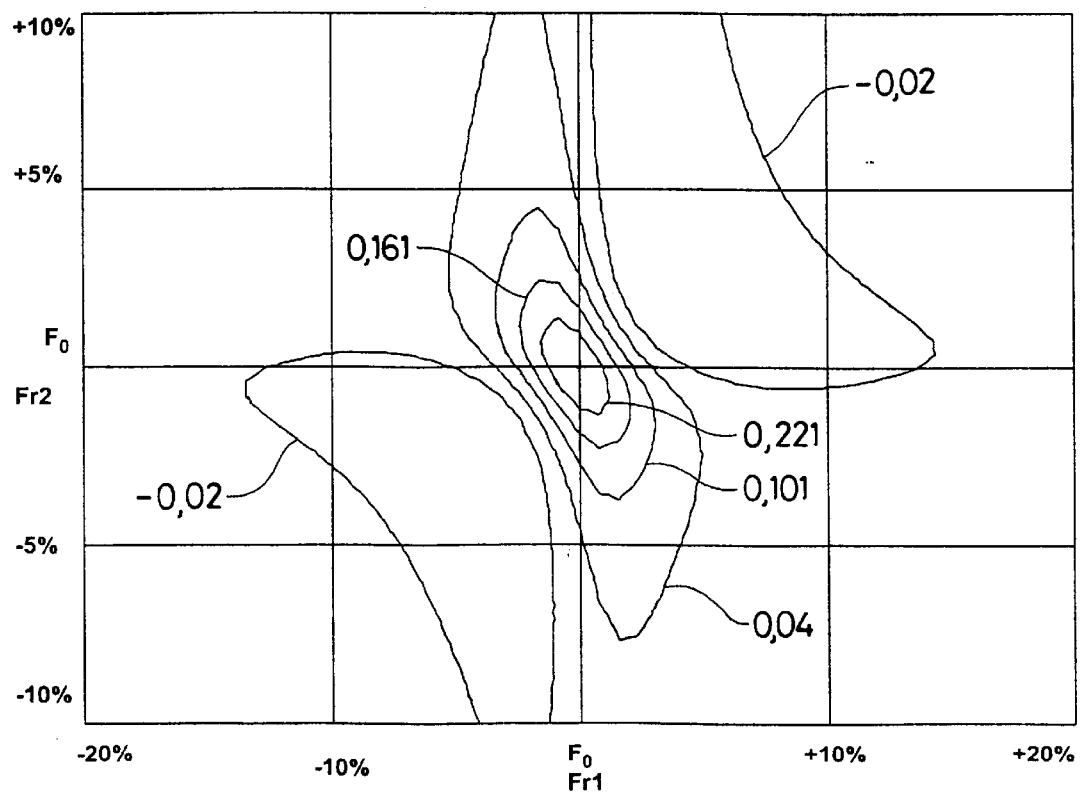
Figure 4A:
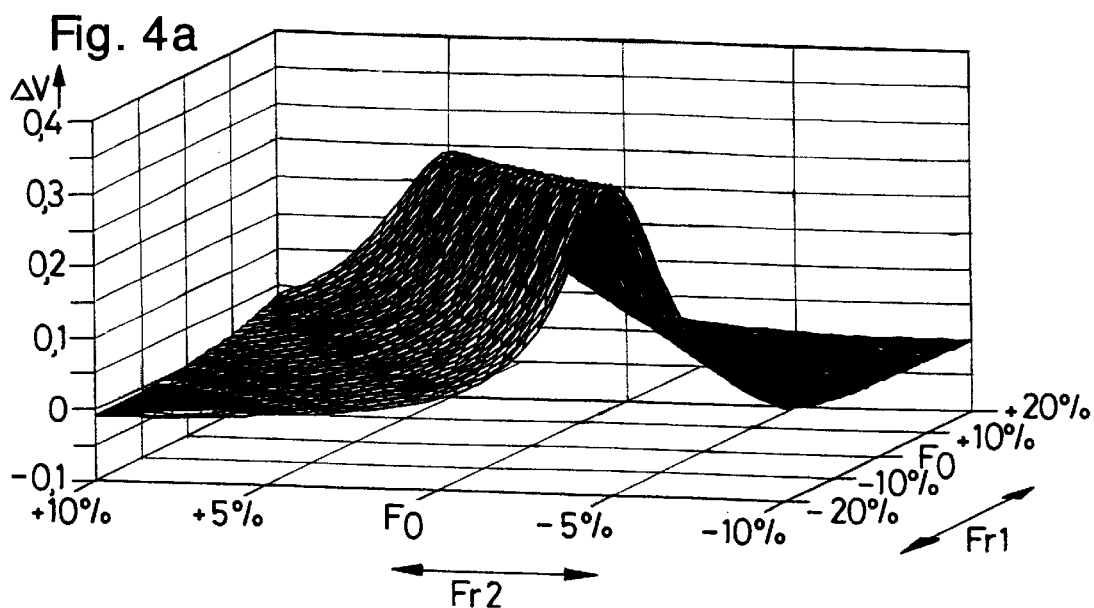
FIG. 4a shows the voltage fluctuations across the terminals of the antenna as a function of the resonant frequency of the antenna and the resonant frequency of the transponder, for a contactless interrogation system comprising a base station according to the invention.
Figure 4B:
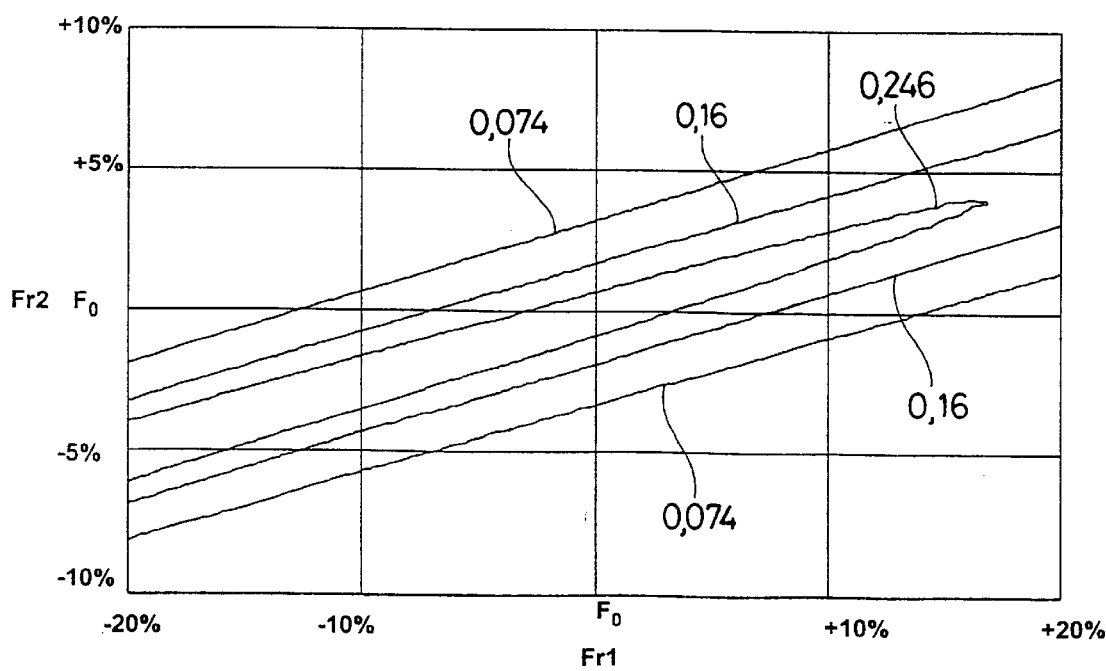

Resonant frequency Fr1 of antenna 15 is typically equal to 125 kHz. However, the real resonant frequency of antenna 15 may be equal to a substantially different value to 125 kHz, as a result of fluctuations in manufacturing parameters. FIG. 4a shows the voltage fluctuations ΔV across the terminals of antenna 15 as a function of frequency Fr1 and frequency Fr2, frequency Fo being equal to Fr1, and FIG. 4b shows some isovalue curves associated with FIG. 4a, for a contactless interrogation system comprising a base station according to the invention. As is shown in these Figures, the contactless interrogation system comprising this base station operates properly, even if the real resonant frequency is comprised between 100 and 150 kHz, providing that frequency Fr2 remains within a few percent of frequency Fo. Fluctuations ΔV remains maximum within this frequency range, as shown in FIG. 4a, in contradistinction to the base stations of the prior art relative to FIGS. 1a and 1b. Moreover, the degree of freedom of the real resonant frequency of antenna 15 is sufficient to assure the proper operation of the contactless interrogation system comprising the base station according to the invention.

It will also be noted that, in FIG. 4b, fluctuation ΔV is always positive, whatever the couple of frequencies Fr1, Fr2. Thus, the contactless interrogation system comprising the base station according to the invention does not have any operating problems of the type described in relation to the prior art systems.

During reception, i.e. when transponder 12 enters the magnetic field of antenna 15, the modified signal is read by antenna 15, then detected by detection circuit 17. Following amplitude modulation by transponder 12, this modified signal must be demodulated, so that decision circuit 27 (FIG. 3), transforms the analog signal received at antenna 15 into a digital signal compatible with microprocessor 14.

Since the base station according to the present invention has improved sensitivity as has been explained hereinbefore, the demodulation circuit may advantageously be simplified with respect to base stations according to the prior art.

In the preferred embodiment of the present invention, demodulation is assured in the following manner. The signal is first sampled by sampler 25 in synchronism with the clock signal originating from oscillator 23. The sampled signal is then filtered by capacitor 18 and by pass band filter 26. Thus the signal corresponding to the amplitude modulated signal received by antenna 15 is converted by comparator 27 so that it is compatible wish microprocessor 14 to which it is supplied by Pin F.

At this stage, it is understood that the function of microprocessor 14 is to validate or invalidate the contactless interrogation induced by the approach of transponder 12, and that it in no event acts on oscillating device 23, contrary to prior art systems already mentioned which require a more complex and thus more expensive microprocessor.

It goes without saying for the man skilled in the art that the detailed description hereinbefore may undergo various modifications without departing from the scope of the present invention.

What is claimed is:

1. A base station connected between a microprocessor and antenna means for transmitting and/or receiving data signals for a contactless interrogation system, said base station comprising an oscillating device supplying a control signal to means for controlling antenna means for transmitting data, said control signal having a carrier frequency which is adjustable via adjusting means, means for decoding the data signals for a microprocessor connected to said base station, said data signals being picked up by said antenna means from received signals, wherein said oscillating device comprises a voltage controlled oscillator which is phase locked by said adjusting means, so that the carrier frequency of said control signal is determined solely by said base station independently of said microprocessor and is continuously tuned to the resonant frequency of said antenna means by said adjusting means in a phase locked loop so that the sensitivity of said base station connected to antenna means is increased.

2. A base station according to claim 1, wherein said oscillating device, said adjusting means, said control means and said decoding means are elements integrated on a same chip.

3. A base station according to claim 1, wherein said adjusting means comprise a phase comparator and a filter which constitute a phase lock means for said oscillating device.

4. A base station according to claim 1, wherein said decoding means comprise a sampler, a pass-band filter and a decision circuit in order to convert data signals for the microprocessor.

5. A base station according to claim 4, wherein said sampler is synchronized by a clock signal originating from said oscillator.

6. A base station according to claim 1, wherein data signals received by said antenna means are radio frequency signals, and wherein said phase locked loop of adjusting means includes a phase comparator for comparing the phase of said carrier frequency control signal to the phase of said resonant frequency signal, said phase comparator producing a correction signal for changing the frequency of said oscillator.

7. A base station according to claim 6, wherein said phase locked loop includes a filter for filtering said correction signal before it is applied to said oscillator.

8. A base station according to claim 1, operating over a frequency range between 100 and 150 kHz.

9. A base station connected to antenna means for transmitting and/or receiving data for a contactless interrogation system, said base station comprising an oscillating device supplying a control signal to means for controlling antenna means for transmitting data, said control signal having a carrier frequency which is adjustable via adjusting means, means for decoding the data picked up by said antenna means from received signals, wherein said oscillating device comprises a voltage controlled oscillator which is phase locked by said adjusting means, so that the carrier frequency of said control signal is determined solely by said base station and is continuously tuned to the resonant frequency of said antenna means by said adjusting means in a phase locked loop, wherein said decoding means comprise a sampler, a pass-band filter and a decision circuit, and wherein said sampler is synchronised by a clock signal originating from said voltage controlled oscillator.

* * * * *